United States Patent
Knoll et al.

(10) Patent No.: US 6,916,885 B2
(45) Date of Patent: Jul. 12, 2005

(54) METHOD FOR BREAKING A CHAIN DURING ANIONIC POLYMERISATION

(75) Inventors: Konrad Knoll, Ludwigshafen (DE); Hermann Gausepohl, Mutterstadt (DE); Josef Richard Wünsch, Schifferstadt (DE); Paul Naegele, Otterstadt (DE); Jürgen Koch, Neuhofen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/399,228

(22) PCT Filed: Oct. 26, 2001

(86) PCT No.: PCT/EP01/12448

§ 371 (c)(1),
(2), (4) Date: Apr. 14, 2003

(87) PCT Pub. No.: WO02/34792

PCT Pub. Date: May 2, 2002

(65) Prior Publication Data

US 2004/0014915 A1 Jan. 22, 2004

(30) Foreign Application Priority Data

Oct. 27, 2000 (DE) .......................................... 100 53 324

(51) Int. Cl.$^7$ ................................................. C08F 12/08
(52) U.S. Cl. ........................ 525/316; 525/250; 526/82; 526/84
(58) Field of Search ................................ 525/316, 250; 526/82, 84

(56) References Cited

U.S. PATENT DOCUMENTS

| 3,139,416 A | | 6/1964 | Lumb et al. |
| 4,017,476 A | | 4/1977 | Murray et al. |
| 4,486,614 A | * | 12/1984 | Donate et al. ................. 585/10 |
| 5,143,990 A | * | 9/1992 | Gibler et al. ................. 526/82 |

OTHER PUBLICATIONS

Prinziples of Anionic Polymerization, 1996, 267, Hsieh et al.
J. of Polymer Sc., Part A–1, vol. 10, 1187–1194 (1972) Reed.

* cited by examiner

*Primary Examiner*—James J. Seidleck
*Assistant Examiner*—Olga Asinovsky
(74) *Attorney, Agent, or Firm*—Novak Druce & Quigg, LLP

(57) ABSTRACT

A process for the preparation of linear polymers or block copolymers of styrene by anionic polymerization comprises carrying out the chain termination with an n-alkyl glycidyl ether or a dialkyl ketone.

9 Claims, No Drawings

METHOD FOR BREAKING A CHAIN DURING ANIONIC POLYMERISATION

The present invention relates to a process for the preparation of linear polymers or block copolymers of styrene by anionic polymerization of styrene and, if desired, butadiene in an inert apolar solvent in the presence of organolithium initiators and subsequent termination of the "living" polymer chains.

In the anionic polymerization of styrene and the copolymerization of styrene and butadiene to produce block copolymers, the "living" chain end has to be terminated. Chain terminators used in practice are alcohols, in particular isopropanol.

When using alcohols as chain terminators in the preparation of linear polymers, formation of wall deposits in the heat exchangers used for heating the polymer solution to 200° C. for flash devolatilization was found to occur within a period of a few days to weeks, resulting in increasing deterioration of heat transfer. Prolonged periods of operation therefore require removal and cleaning of the heat exchanger. Formation of a white deposit, probably comprising lithium isopropoxide and lithium hydroxide, is also observed in the polymerization vessel itself.

It is therefore an object of the present invention to suppress the formation of these deposits. We have found that this object is achieved by using an n-alkyl glycidyl ether or a dialkyl ketone as chain terminator.

The present invention therefore provides a process for the preparation of linear polymers or block copolymers of styrene by anionic polymerization of styrene and, if desired, butadiene in an inert apolar solvent and subsequent termination of the "living" polymer chains with an n-alkyl glycidyl ether or a dialkyl ketone.

Hydrolysis of the lithium alkoxide obtained by chain termination produces a hydroxy-terminated polymer. The functionalization of living anionic polymers, in particular of polybutadiene and polyisoprene, with terminal hydroxyl groups by chain termination with ethylene oxide is known in the art, e.g. from H. L. Hsieh and R. P. Quirk, "Principles of Anionic Polymerization", Marcel Dekker 1996, page 267, and S. F. Reed, Journal of Polymer Science, Part A-1, Col. 10 (1972), pages 1187–1194. However, these publications do not suggest that the formation of deposits during anionic polymerization of styrene can be suppressed by functionalization with hydroxyl groups. Using ethylene oxide as chain terminator would require extensive safety precautions because of its carcinogenicity, so that it would not be suitable in an industrial process anyway.

The anionic polymerization of styrene and the copolymerization of styrene and butadiene to produce block copolymers are well known. Block copolymers consist of a plurality of polymer blocks, e.g. polystyrene, polybutadiene and butadiene/styrene copolymer blocks. The latter can be random copolymers or e.g. tapered copolymer blocks, where initially a polybutadiene sequence forms into which more and more styrene is incorporated as the polymerization progresses, so that eventually a polystyrene sequence is formed. In each case, a lithium atom is present at the chain end which must be terminated.

The anionic polymerization is carried out in an inert apolar solvent, preferably in cyclohexane. Preferred organolithium initiators are n-butyllithium and sec-butyllithium. The usual adjuvants may be added during polymerization, such as ethers, e.g. tetrahydrofuran, which act as activators for n-butyllithium and—when used in larger amounts—as randomizers for the preparation of random copolymers, and potassium alkoxides, such as potassium tert-amylate, which also act as randomizers.

After the polymerization has ended, chain termination is effected according to the invention with an n-alkyl glycidyl ether or a dialkyl ketone. Preferred chain terminators are n-butyl glycidyl ether and diethyl ketone. The chain terminator is conveniently used in stoichiometric amounts, based on lithium, or in a slightly substoichiometric amount, preferably in a molar ratio of from 1:1 to 1:0.95. By using a slightly substoichiometric amount, it is possible to prevent chain terminator residues from remaining in the polymer.

It has been found that the chain termination according to the invention often results in a large increase in the viscosity of the polymer solution. In a preferred embodiment of the invention, alcohols, preferably isopropanol or glycerol, can be used in substoichiometric amounts to reduce the viscosity once again. Preference is given to using from 1 to 99, in particular 5 to 50, mol of alcohol per 100 mol of lithium.

Chain termination or viscosity reduction is followed by hydrolysis of the resulting lithium alkoxide. This can be done with organic and inorganic acids, preferably with $CO_2/H_2O$. This also leads to termination of residual carbanions which are present when a substoichiometric amount of chain terminator is used.

The lithium salt which is formed in the hydrolysis should be soluble, or at least finely dispersible, in the polymer solution, so that the polymer remains transparent. This is true for lithium carbonate which is formed when the hydrolysis is carried out with $CO_2/H_2O$.

Chain termination and hydrolysis are followed by conventional stabilization of the polymer solution, e.g. with trisnonylphenyl phosphite, 2,6-di-tert-butyl-4-methylphenol, Irganox 1076 or Irganox 3052 (CIBA SC), and removal of solvent by conventional devolatilization processes.

INVENTIVE EXAMPLE 1

An inertized and nitrogen-blanketed 10 l stainless steel stirred reactor was charged with 2991 ml of cyclohexane, which had been dried over alumina, and 1 ml of 1,1-diphenylethene, and a 1.3 molar solution of sec-butyllithium in cyclohexane was added to the mixture at 58° C. until a slight red color appeared at 1.6 ml. 15.4 ml of s-butyllithium and 1.48 ml of potassium tert-amylate (5.4% strength in cyclohexane) were then injected into the vessel. 1100 ml of styrene were metered in over the course of 10 min at 50° C. with cooling. The temperature rose to 97° C. The solution was deep dark red to blackish. 2 min after reaching the maximum temperature and after the temperature had started to fall again, 2.86 ml (19 mmol=95 mol %, based on sec-butyllithium) of butyl glycidyl ether were added. After 5 min, the solution was bright red. The viscosity had increased significantly. The solution was then admixed with 3.0 g of a 10% strength solution of isopropanol (25 mol %, based on butyllithium) in cyclohexane, reducing the viscosity back to the original value prior to the butyl glycidyl ether addition. The solution was cooled to 40° C. and drained into a canister, and 10 g of dry ice ($CO_2$) and 5 ml of water were added with subsequent shaking. The solution was then water-clear and colorless. It did not change over the course of several days.

The GPC analysis showed a monomodal peak with $M_w/M_n=1.03$ and $M_n=54\,000$ g/mol (theoretical value: 50 000).

The solution was evaporated in a vacuum drying oven and the residue was compression molded at 180° C. to give 2 mm plates which were used for determining transparency: transmission 88.59%, yellowness index: 1.7; haze: 4.1.

COMPARATIVE EXAMPLE 1

The polymerization was carried out as described in Example 1, except that termination was effected by adding 12 g of a 10% strength isopropanol solution instead of butyl glycidyl ether. The pale yellow solution was then acidified as described above with 10 g of dry ice ($CO_2$) and 5 ml of water. The solution was colorless, but milky. After the solution was left for one day, a voluminous white precipitate formed which was identified as moist $Li_2CO_3$.

INVENTIVE EXAMPLE 2

The procedure described in Example 1 was repeated, except that 2.01 ml of diethyl ketone were used instead of butyl glycidyl ether, and work up was carried out as described in Example 1. The solution was then likewise clear as water and colorless. It did not change over the course of several days.

GPC analysis showed a monomodal peak with $M_w/M_n = 1.03$ and $M_n = 53\,000$ g/mol (theoretical value: 50 000).

The solution was evaporated in a vacuum drying oven and the residue was compression molded at 180° C. to give 2 mm plates which were used for determining transparency: transmission 89.00%, yellowness index: 1.6; haze: 2.7.

INVENTIVE EXAMPLE 3

The procedure described in Example 1 was repeated, except that 1.99 ml of cyclohexanone were used instead of butyl glycidyl ether, and work up was carried out as described in Example 1. The solution was then likewise water-clear and colorless. It did not change over the course of several days.

GPC analysis shows a bimodal molecular weight distribution with maxima at 47 000 and 94 000 g/mol. The high molecular weight fraction was 21%.

INVENTIVE EXAMPLE 4

The procedure described in Example 1 was repeated, except that 12 g of a 10% strength acetone solution were used instead of butyl glycidyl ether, and work up was carried out as described in Example 1. The solution was then likewise water-clear, but deep brown-red in color. It did not change over the course of several days.

GPC analysis showed a bimodal molecular weight distribution with maxima at 47 000 and 94 000 g/mol. The high molecular weight fraction was 25%.

INVENTIVE EXAMPLE 5

An inertized and nitrogen-blanketed 10 l stainless stirred reactor was charged with 4786 ml of a cyclohexane, which had been dried over alumina, and 1 ml of 1,1-diphenylethene, and a 1.4 molar solution of sec-butyllithium in cyclohexane was added to the mixture at 58° C. until a slight red color appeared at 1.6 ml. 10.4 ml (14.6 mmol) of 1.4 molar s-butyllithium and 1.16 ml (0.39 mmol) of potassium tert-amylate (0.338 molar in cyclohexane) were injected into the vessel. In a temperature range between 40 and 65° C., the following monomer amounts are successively added and completely polymerized:

a) 211 ml (192 g) of styrene,
b) 146 ml (133 g) of styrene and 335 ml (219 g) of butadiene simultaneously,
c) 276 ml (251 g) of styrene and 276 ml (181 g) of butadiene simultaneously,
d) 686 ml (624 g) of styrene.

2 min after reaching the maximum temperature and after the temperature had started to fall again, 1.97 ml (14.5 mmol=95 mol %, based on sec-butyllithium) of butyl glycidyl ether were added. After 5 min, the initially red-black solution was bright red. The viscosity had increased significantly. The solution was then admixed with 0.07 ml (2.9 mmol) of glycerol, reducing the viscosity back to the original value prior to the butyl glycidyl ether addition. The solution was cooled to 40° C. and drained into a canister, and 7 g of dry ice ($CO_2$) and 3.4 ml of water were added with subsequent shaking. The solution was then water-clear and colorless. It became slightly cloudy after one day. GPC analysis showed a monomodal peak with $M_w/M_n = 1.135$ and $M_n = 146\,000$ g/mol.

COMPARATIVE EXAMPLE 5

The experiment was carried out as described in Example 5, except that 0.9 g of isopropanol was added instead of butyl glycidyl ether. Acidifying with $CO_2$/water gave a colorless, but very cloudy solution in which a thick, fluffy precipitate formed within the course of one day.

We claim:

1. A process for the preparation of linear polymers or block copolymers of styrene by anionic polymerization of styrene and, optionally, butadiene in an inert apolar solvent in the presence of organolithium initiators and subsequent termination of the "living" polymer chains, which comprises carrying out the chain termination with an n-alkyl glycidyl ether.

2. A process as claimed in claim 1, wherein the chain terminator used is n-butyl glycidyl ether.

3. A process as claimed in claim 1, wherein the chain terminator is used in stoichiometric or slightly substoichiometric amounts, based on lithium.

4. A process as claimed in claim 1, wherein the chain termination is followed by addition of alcohols, in substoichiometric amounts, based on lithium, in order to reduce the viscosity of the solution.

5. A process as claimed in claim 1, wherein the chain termination as claimed in claim 1 or the viscosity reduction as claimed in claim 4 is followed by hydrolysis of the resulting lithium alkoxide.

6. A process as claimed in claim 5, wherein the hydrolysis is carried out with aqueous acids.

7. A process for the preparation of linear polymers or block copolymers of styrene by anionic polymerization of styrene and, optionally, butadiene in an inert apolar solvent in the presence of organolithium initiators and subsequent termination of the "living" polymer chains, which comprises carrying out the chain termination with an n-alkyl glycidyl ether, whereby formation of wall deposits in the polymerization vessel is suppressed.

8. The process of claim 4, wherein the alcohols are isopropanol or glycerol.

9. The process of claim 6, wherein the aqueous acid is $CO_2/H_2O$.

* * * * *